United States Patent [19]

Suhner

[11] Patent Number: 5,514,030

[45] Date of Patent: May 7, 1996

[54] METHOD AND CONTINUOUS-FLOW VACUUM TUMBLER FOR THE TREATMENT OF FOODS

[75] Inventor: Beat Suhner, Niederrohrdorf, Switzerland

[73] Assignee: Dorit Maschinen-Handels-AG, Killwangen, Switzerland

[21] Appl. No.: 275,993

[22] Filed: Jul. 15, 1994

[30] Foreign Application Priority Data

Aug. 13, 1993 [CH] Switzerland ............................ 2404/93
Mar. 2, 1994 [CH] Switzerland ............................ 610/94

[51] Int. Cl.⁶ .................................................. A22C 9/00
[52] U.S. Cl. .......................... 452/141; 99/472; 426/281; 426/524
[58] Field of Search ................... 452/141, 198; 426/524, 652, 519, 281; 99/472; 366/139

[56] References Cited

U.S. PATENT DOCUMENTS

| | | | |
|---|---|---|---|
| 3,928,634 | 12/1975 | Gasbarro | 426/281 |
| 4,517,888 | 5/1985 | Gould | 99/472 |
| 4,815,165 | 3/1989 | Gibson | 452/141 |
| 4,942,053 | 7/1990 | Franklin et al. | 426/524 |
| 4,958,410 | 9/1990 | Lagares | 452/141 |
| 5,104,232 | 4/1992 | Lennox, III | 99/472 |

FOREIGN PATENT DOCUMENTS

| | | |
|---|---|---|
| 0274334 | 7/1988 | European Pat. Off. . |
| 0457181 | 11/1991 | European Pat. Off. . |
| 2387607 | 11/1978 | France . |
| 9314582 | 2/1994 | Germany . |
| 991972 | 1/1983 | U.S.S.R. ............................ 452/141 |
| 1232905 | 5/1971 | United Kingdom . |
| 2085742 | 5/1982 | United Kingdom . |
| 2098849 | 12/1982 | United Kingdom . |
| 8908982 | 10/1989 | WIPO . |

OTHER PUBLICATIONS

Database WPI, Week 8045, Derwent Publications Ltd., London, GB AN 80–80223 & Su–A–724 112 (Moscow Meat Dairy Inst), Mar. 31, 1980.

*Primary Examiner*—Willis Little
*Attorney, Agent, or Firm*—Martin A. Farber

[57] ABSTRACT

The vacuum tumbler has an evacuatable drum (3) which is mounted for rotation around its longitudinal axis (11) and is provided on one end side with a loading opening and on the other end side with a removal opening (12). In order to obtain continuous operation, a vacuum sluice (19, 19') is arranged both at the loading opening (12) and at the removal opening (12') and in each case a vacuum packing (17), which is effective when the drum (3) is rotating, is present between the two openings (12, 12') and the corresponding vacuum sluice (19, 19').

16 Claims, 2 Drawing Sheets

METHOD AND CONTINUOUS-FLOW VACUUM TUMBLER FOR THE TREATMENT OF FOODS

FIELD AND BACKGROUND OF THE INVENTION

The present invention relates to a method and a vacuum tumbler in accordance with the preambles to Claims 1 and 10.

Vacuum tumblers for the treatment of pieces of meat such as, for instance, tenderizing, macerating, marinating, etc. are known. It is known in the case of industrial tumblers to load the pieces of meat through an opening arranged at the front of the drum and to remove them through an opening at the rear thereof. By means of baffles arranged within the drum, uniform tumbling of the loaded pieces of meat is obtained. These tumblers, however, have the disadvantage that, after the end of the period of treatment, the loading and emptying openings must be opened, and the tumbler emptied, newly loaded, and again evacuated. Due to this intermittent operation which requires a large amount of work as a result of the loading and unloading, the downtimes of the machine are relatively long and its output low.

SUMMARY OF THE INVENTION

It is an object of the present invention so to improve a method and an apparatus of this type that continuous operation is possible.

The invention permits the advantage that each piece of meat is subjected to precisely the predetermined time of treatment, so that the optimal manner of treatment can be precisely established. In this way, the treatment time is also minimized and the output of the machine improved. Furthermore, the manual work for the loading and unloading of the drum is dispensed with.

BRIEF DESCRIPTION OF THE DRAWINGS

With the above and other and other advantages in view, the present invention will become more clearly understood in connection with the detailed description of a preferred embodiment, when considered with the accompanying drawings of which.

DETAILED DESCRIPTION OF THE PREFERRED EMBODIMENT

Figure 2:
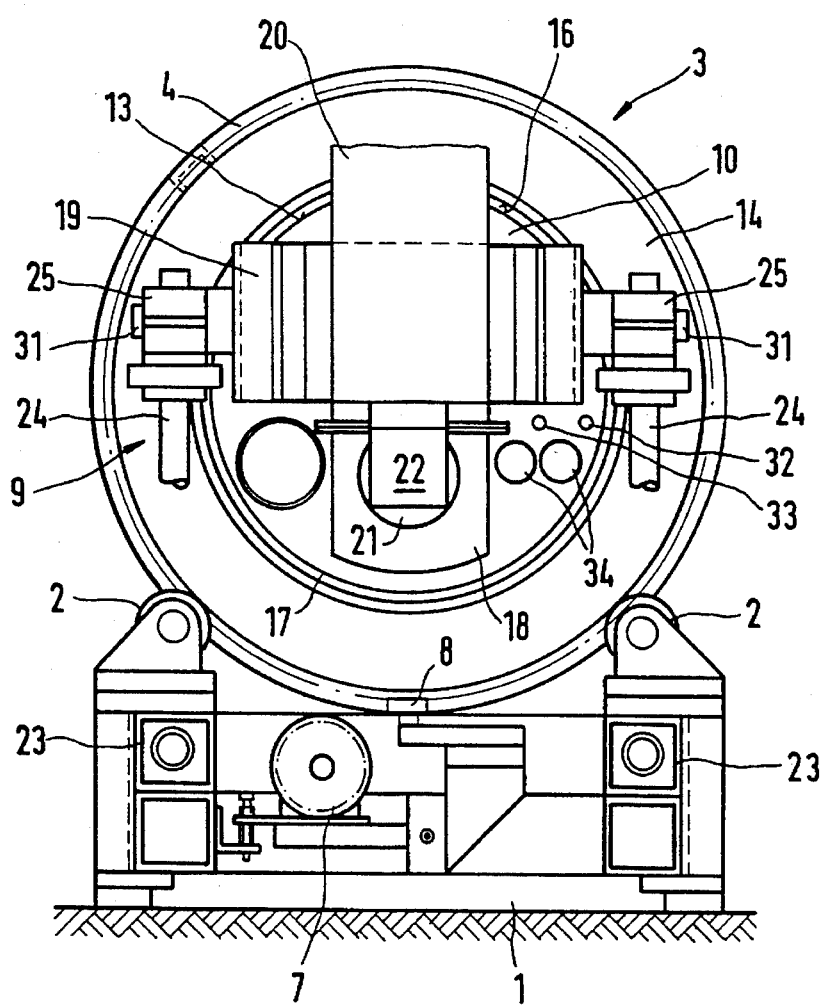
FIG. 2 is a view of the vacuum tumbler of FIG. 1, seen in the direction of the arrow II.
Figure 3:
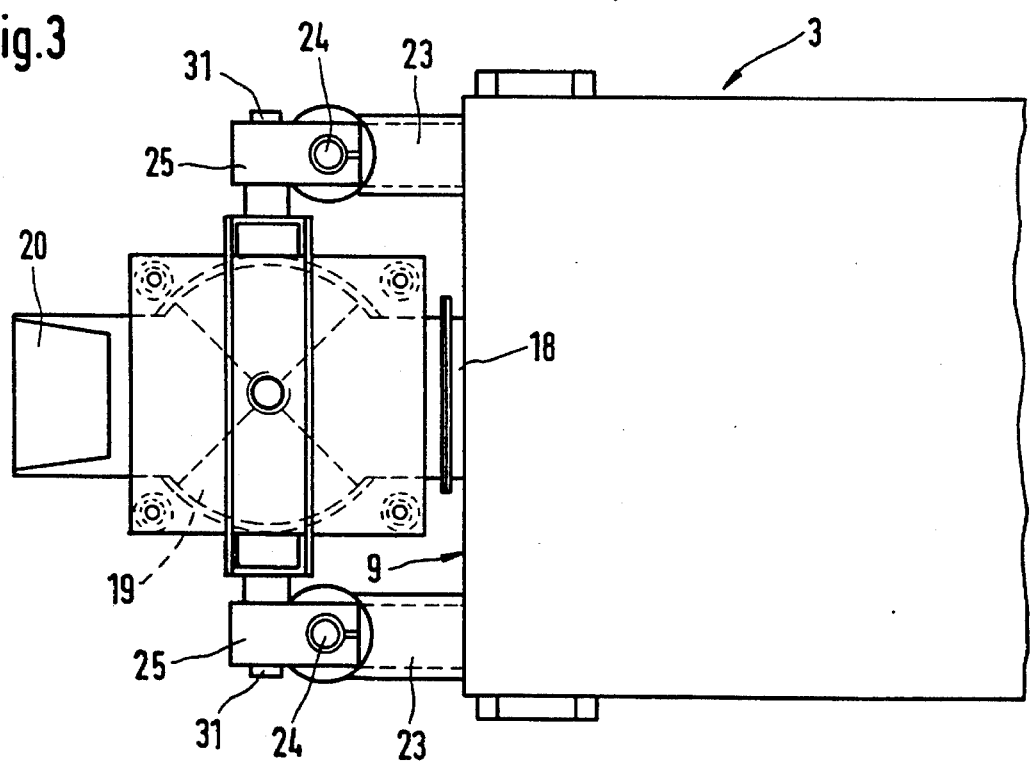
FIG. 3 is a top view of the left-hand end of the vacuum tumbler in FIG. 1.

The stationary machine bed 1 has, at its one end, a pair of rollers 2 (FIG. 2) between which further pairs of rollers may be present at uniform distances apart. A drum 3 is mounted, free for rotation, on these pairs of rollers 2, it being provided with a peripheral gear rim 4 in its longitudinal center. Below the drum 3, a drive unit is mounted in the machine bed 1, said unit comprising a motor 5 and a reduction gearing 6, a gear wheel 7 being firmly attached on the driven shaft of the gearing. The gear wheel meshes with the gear rim 4 surrounding the drum 3. Guide rollers which are mounted for free rotation on the machine bed 1 and rest against the gear rim 4 prevent displacement of the drum 3 in longitudinal axial direction on the pairs of rollers 2. With the motor 5 operating, the drum 3 rotates, it rolling on the pairs of rollers 2.

At its two ends, the drum 3 of the vacuum tumbler is closed by end walls 9 and 9' which are of substantially identical development. Therefore, only the front part will be described, and corresponding parts of the rear part are provided with corresponding reference numerals. The end wall 9 is divided into two wall sections 10 and 14. The inner wall section 10, which does not rotate with the drum 3, is coaxial to the axis of rotation 11 of the drum and is provided with a loading opening 12. It is limited in radial direction by a cylindrical surface 13 which forms a circular peripheral circumferential surface. This inner wall section 10 is surrounded axially by the annular outer wall section 14, on the outer circumference of which the shell 15 of the drum 3 is fastened. The inner circumference of the outer wall section 14 is formed by a cylindrical inner surface 16 which lies opposite the circumferential surface 13, forming an annular slot.

The annular slot is filled and sealed off by a vacuum packing 17. The vacuum packing 17 is firmly attached to one of the wall sections 10 and/or 14 and permits relative rotation around the axis of rotation 11 of the drum between the two wall sections 10 and 14. The inner wall section 10 is furthermore displaceable back and forth, as described later, in the direction of the axis of rotation 11 of the drum and can be moved into the drum 3 and out of it.

Adjoining the loading opening 12 on the outside, there is a loading socket 18 to which a vacuum bucket-wheel sluice 19 having a filling hopper 20 is flanged. The bucket wheel of the sluice 19 can be driven by means of a motor 21 and a gearing 22. The radially oriented bucket walls of the bucket-wheel sluice 19 seal the inside of the drum 3 off in vacuum-tight manner from the outside. Pieces of meat placed into the filling hopper 20 slide into the bucket of the bucket-wheel sluice 19 which is open facing the hopper. Upon rotation of the bucket wheel, this cell, which is loaded with meat, is closed off from the outer atmosphere and then opened towards the inside of the drum and the vacuum prevailing there, whereupon the pieces of meat slide through the loading socket 18 into the drum 3. Instead of a bucket-wheel sluice, a vacuum slide sluice can also be used.

In order to compensate for small eccentricities in the rotation of the drum 3, the inner wall section 10, together with the bucket-wheel sluice 19, is mounted so to speak "floating". For this purpose, brackets 23 are provided which are connected on both ends of the drum on opposite sides with the machine bed 1 and each of which bears a vertical guide post 24. A sleeve 25 having a swivel bearing 26 is pushed over each of the guide posts 24. The sleeve 25 is displaceable axially on the guide post 24 by a distance which is limited by stops (not shown), so that it can follow along in small vertical movements of the inner part 10 of the end wall. The housing of the bucket-wheel sluice 19 has laterally protruding journal pins 31 which are mounted swingably in the swivel bearings 26 and axially displaceable by a limited distance. If the drum 3 rotates slightly eccentrically, the inner wall section 10 can easily follow it due to the vertical and horizontal displaceability of the sleeve 25 and the swingable mounting of the bucket-wheel sluice 19.

Figure 1:
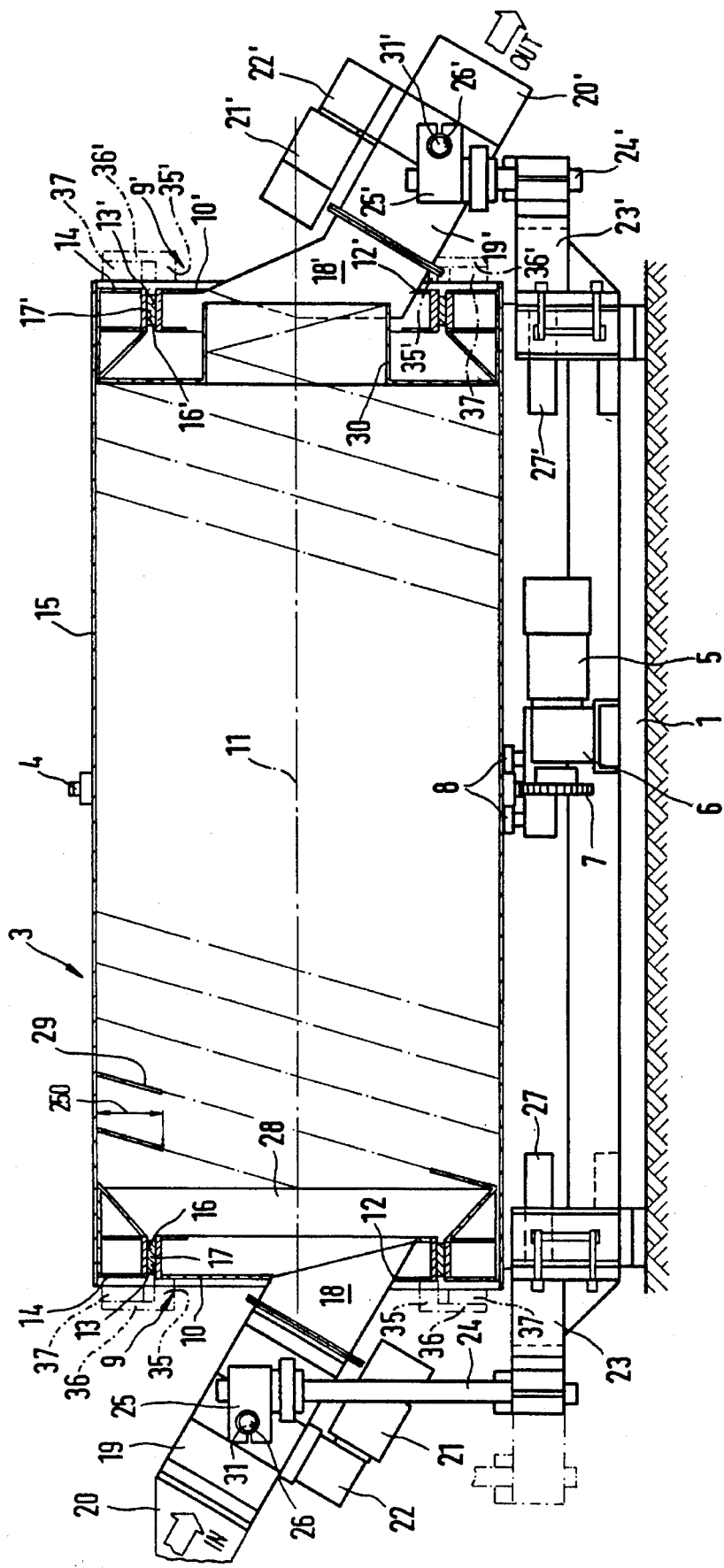
FIG. 1 is a side view of a vacuum tumbler, parts thereof being broken away.

Each of the brackets 23 is mounted displaceably on a displacement bearing 27 parallel to the axis of rotation 11 of the drum and can be pushed out of the position shown in heavy dashes in FIG. 1 into the dot-dash position and back again. Upon such a displacement, the inner wall section 10 is pushed axially out of the drum 3. After this pushing, the wall section 10 can be swung 90° together with the bucket-wheel sluice 19, as a result of which the inside of the drum is easily accessible for cleaning or repair.

On its inner side, the drum 3 forms a funnel-shaped cone 28 which tapers down towards the loading opening 12 and deflects the entering pieces of meat between two adjacent turns of a helix 29 which extends over the longitudinal axis of the drum. The helix 29 is attached, fixed for rotation, to the drum and is spaced by a distance of zero to about 5 millimeters from the wall 15 of the drum. No spacing is desired if a given amount of treatment liquid, such as for instance a brine or marinade, is to be held imprisoned between the walls. On the other hand, a spacing is indicated when the turns for the treatment liquid are to communicate with each other so that it can distribute itself uniformly over the length of the drum. The rib height of the helix is preferably 20 to 30 centimeters and its pitch is preferably about 20 centimeters. The rib height and pitch are so dimensioned that the load of meat fed by one cell of the bucket-wheel sluice 19 into the drum 3 fills the effective space between two adjacent turns.

The end wall 9' of the drum 3 has a removal opening 12' adjoining which there is a removal socket 18' onto which a bucket-wheel sluice 19' is flanged. The development of the end wall 9', its connection to the bucket-wheel sluice 19' and its floating and disengagable mounting are the same as in the case of the end wall 9, so that a description thereof will not be given again.

At the end of the drum 3, its effective inner diameter tapers down a discharge socket 30. The diameter of the helix tapers down in corresponding manner, so that the helices 29 convey the pieces of meat lying between the turns through the outlet socket 30 into the removal socket 18 which feeds them continuously to the bucket-wheel sluice 19'. Instead of the bucket-wheel sluice 19', a slide sluice can also be used The inner wall part 10 on the entrance side is provided, in addition to the loading opening 12, also with a connection 32 for a source of vacuum, with a connection 33 for a treatment solution and with a connection 34 for supercooled carbon dioxide for the thermal control of the material being treated.

Instead of carbon dioxide, some other cooling agent can also be used such as, for instance, liquid nitrogen. Some of all the connections 32, 33, 34 could also be arranged on the removal side in the inner wall part 10'. On one of the two wall parts 10, 10' there is furthermore a suction socket (not shown) by which the evaporating coolant is drawn off.

The treatment solutions and/or the heat treatment means can be introduced under vacuum into the tumbler though the connections 33 and 34.

Further baffles which act on the material being treated can be installed between the individual turns of the helix 29.

In order to stabilize the wall sections 10, 10' against the action of the vacuum, there are fastened on its outer sides (shown in dash-dot line FIG. 1) in each case three to four bearing members 35, 35' which are arranged with radial symmetry around the axis of rotation 11 of the drum. Each of these bearing members 35 35' forms a stop 36, 36', said stopes 36, 36' each lying against the end surface of buckling-resistant pressure bars 37. The pressure bars 37 surround the drum 3 in the manner of a cage and are firmly attached to each other and to the machine bed 1. The forces exerted by a vacuum in the drum 3 on the wall sections 10, 10' are transmitted in the direction of the axis of rotation 11 of the drum and distributed uniformly around the axis of rotation 11 of the drum as axial pressure forces on the two ends of the pressure bars 37 and are taken up by them.

With the apparatus described, meat can be tenderized, macerated, salted or marinated. The same is true of poultry, fish and seafood. Granulated foods can also be polished, or pellets treated, by means of this apparatus.

I claim:

1. A vacuum tumbler for treating portions of food in which the portions are exposed for a given period of time to at least one treatment medium by a conveyance of the portions one after the other continuously along a path through a treatment zone for subjecting the portions to the treatment medium during their continuous passage through the treatment zone, the tumbler comprising:

an evacuatable drum which is rotatably mounted around its longitudinal axis, the drum having at one end thereof a loading opening and at the other end thereof a removal opening and exerting on material being treated a conveying action from the loading opening to the removal opening;

means for enabling continuous passing of said portions into and out of said drum comprising a first and a second vacuum sluice connected respectively to the loading opening and to the removal opening respectively; and means for sealing the ends of the drum around said openings during rotation of the drum comprising a vacuum packing, the vacuum packing being disposed around the loading opening and around the removal opening at said ends, respectively.

2. A vacuum tumbler according to claim 1, wherein at least the first sluice is a metering sluice.

3. A vacuum tumbler according to claim 2, wherein said metering sluice is a bucket wheel which is rotatably mounted, wherein in one rotation position of said bucket wheel said bucket wheel communicates with atmosphere to receive said portions, and in another rotation position said bucket wheel communicates with said loading opening of said drum to transfer said portions into the drum and is closed-off from the atmosphere.

4. A vacuum tumbler according to claim 2, wherein said metering sluice is a slide sluice.

5. A vacuum tumbler according to claim 1, further comprising a helix disposed in the drum.

6. A vacuum tumbler according to claim 5, wherein the helix is positioned relative to an inner wall of the drum with a spacing in the range of zero to a few millimeters.

7. A vacuum tumbler according to claim 5, wherein the drum undergoes one revolution during one operating cycle of either one of said vacuum sluices.

8. A vacuum tumbler according to claim 1, wherein the drum has a first end wall and a second end wall opposite the first end wall, each of the end walls has a central wall section which is non-rotatable, each of the central wall sections of the respective end walls has a circular peripheral surrounding surface around which a shell of the drum rotates, the loading and the removal openings being defined in the respective central wall sections.

9. A vacuum tumbler according to claim 8, wherein each of the end walls has an annular wall section which surrounds the respective central wall section, is firmly attached to the shell of the drum, and rotates with the drum shell, said vacuum packing comprising vacuum ring packings disposed at said circular peripheral surrounding surfaces between the central and the annular wall sections of the respective end walls.

10. A vacuum tumbler according to claim 8, further comprising a plurality of shafts oriented transversely to the longitudinal axis of the drum;

wherein the central wall sections of the respective end walls are swingably mounted on respective ones of the shafts;

distances of the respective shafts from the longitudinal axis of the drum are variable; and the shafts are displaceable in the direction of the longitudinal axis of the drum.

11. A vacuum tumbler according to claim 8, further comprising, in at least one of the central sections, connections for a vacuum line.

12. A vacuum tumbler according to claim 8, further comprising rollers for supporting the drum, the drum having a circumferential gear rim;

wherein the shell of the drum is rotatably mounted on said rollers to be driven rotationally on the circumferential gear rim.

13. A vacuum tumbler according to claim 8, further comprising connections for a line for feeding treatment ingredients, in at least one of the central sections.

14. A vacuum tumbler according to claim 8, further comprising connections for a gas line for feeding a gas for thermal treatment of material within the drum, in at least one of the central sections.

15. A vacuum tumbler according to claim 1, wherein said drum includes non-rotatable end walls having said loading opening and said removal opening respectively of said drum.

16. A vacuum tumbler according to claim 15, wherein said packing is disposed between a peripheral edge of each of said end walls and the ends of said drum rotating around said openings.

* * * * *